D. G. VEDDER.
METHOD OF SHUTTING A DELETERIOUS FLUID OUT OF VALUE PRODUCING WELLS.
APPLICATION FILED JULY 25, 1919.
1,342,781.
Patented June 8, 1920.
5 SHEETS—SHEET 1.
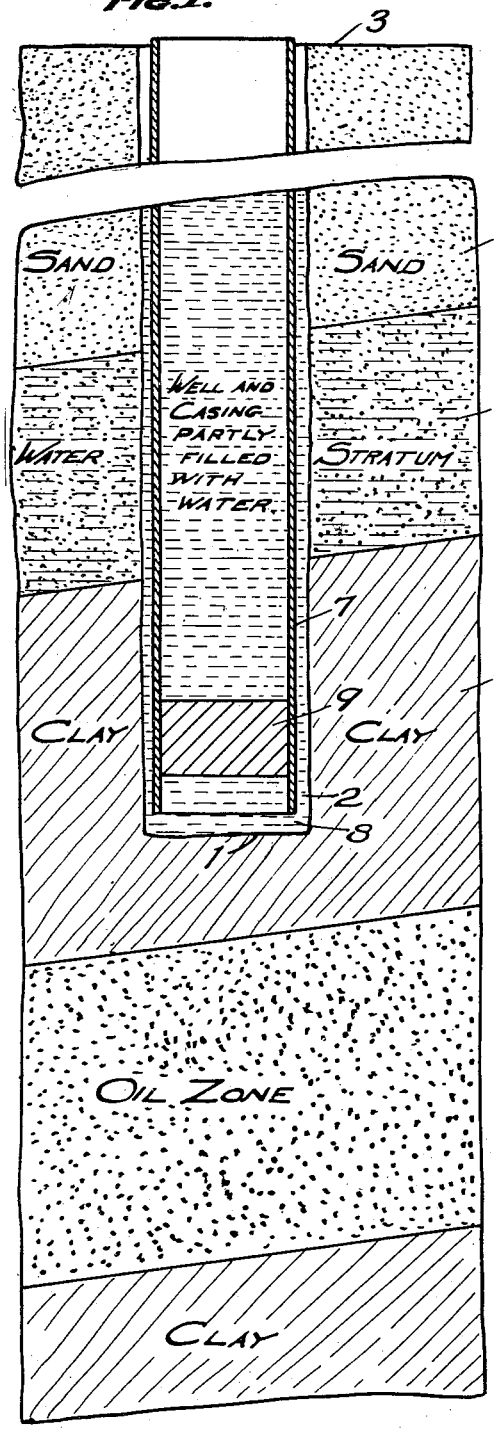
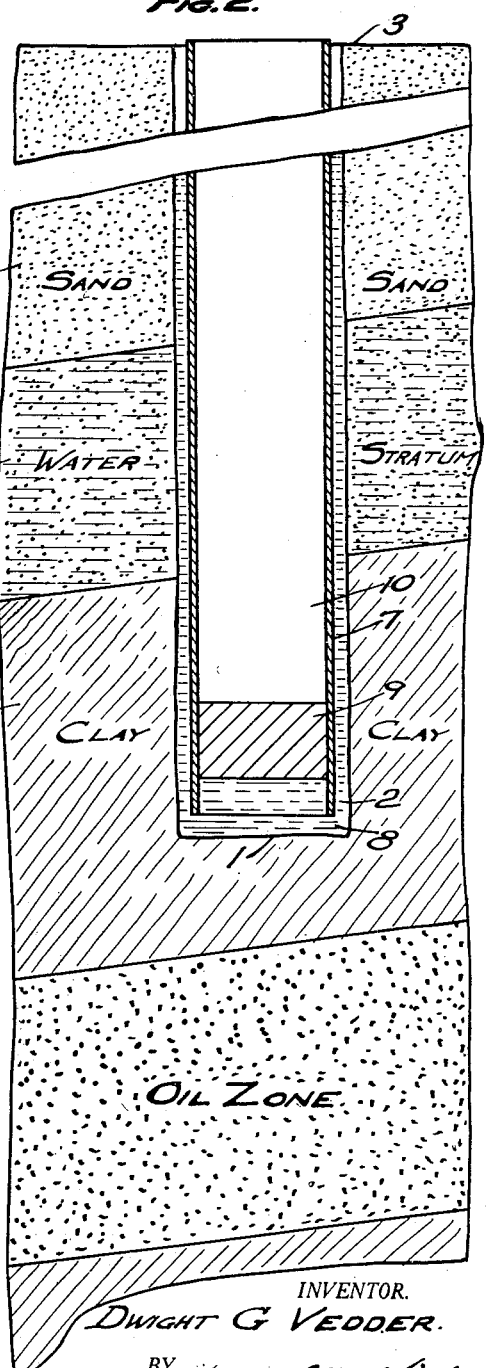
INVENTOR.
DWIGHT G VEDDER.
BY
ATTORNEYS.

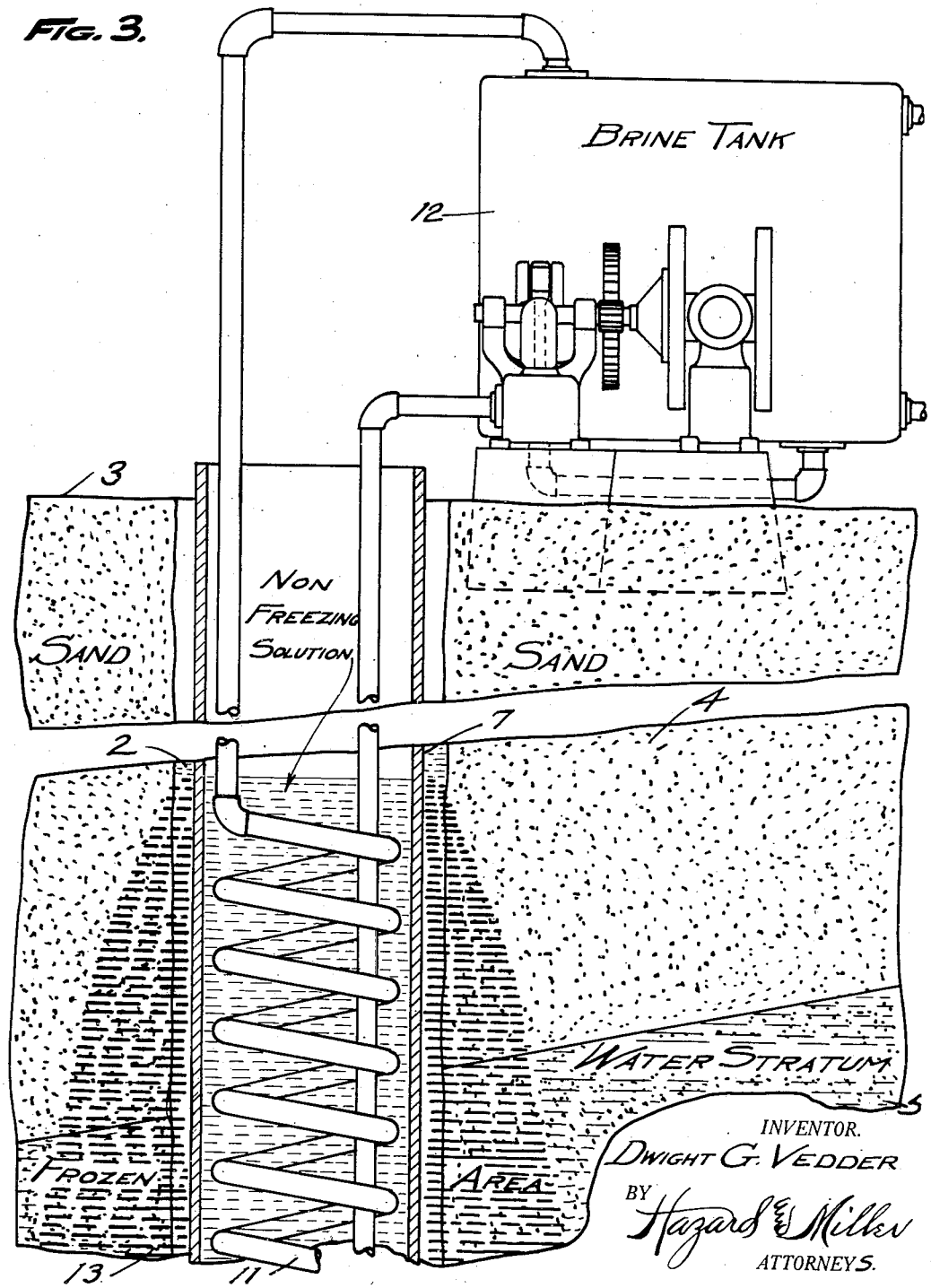

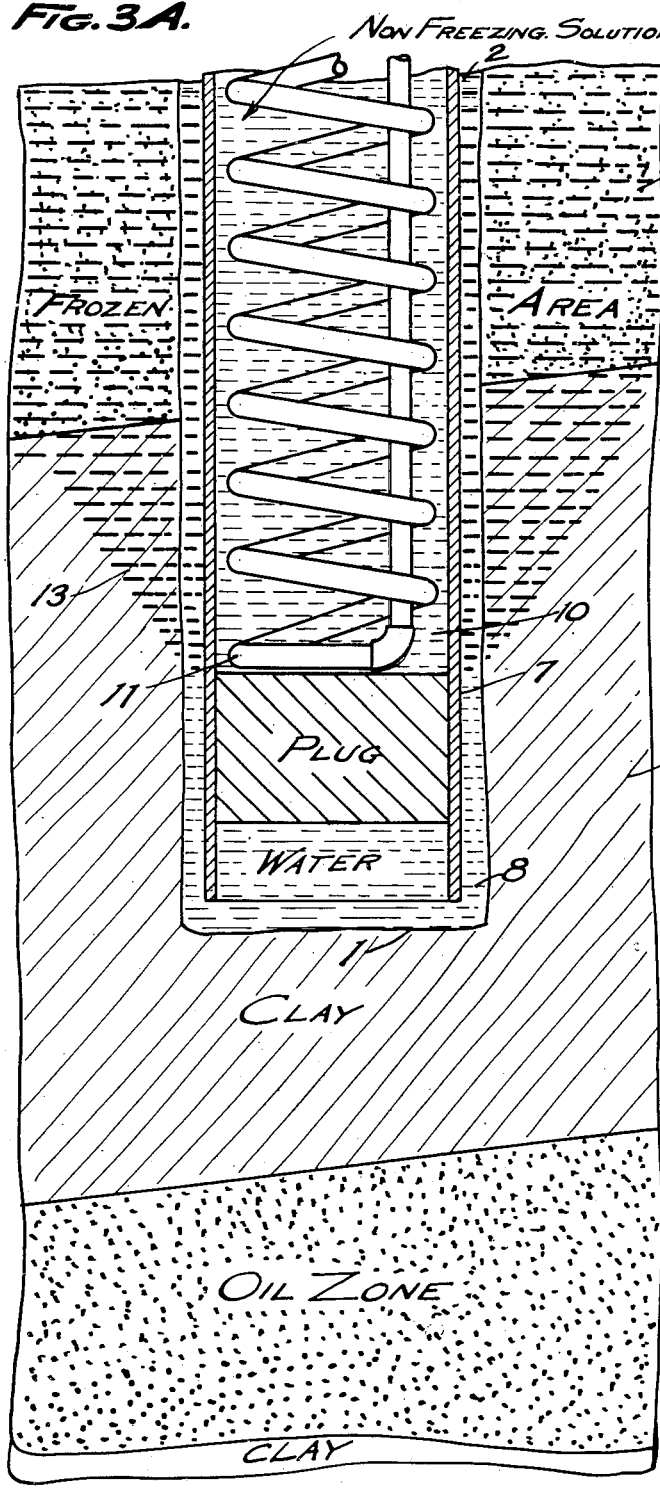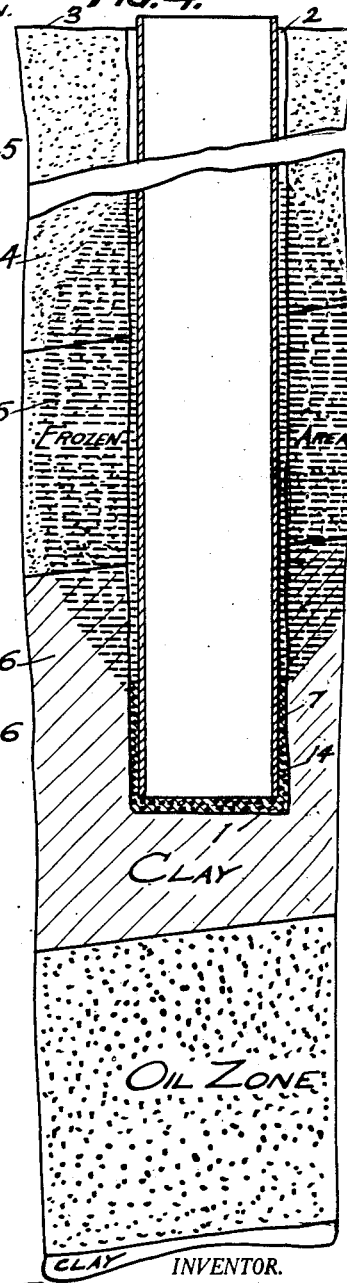

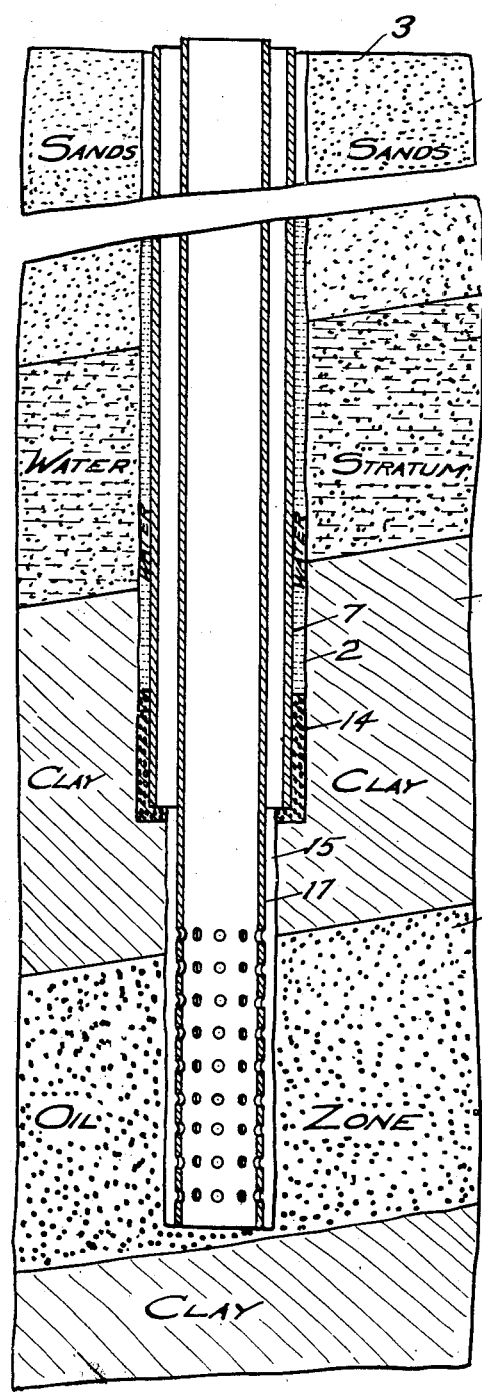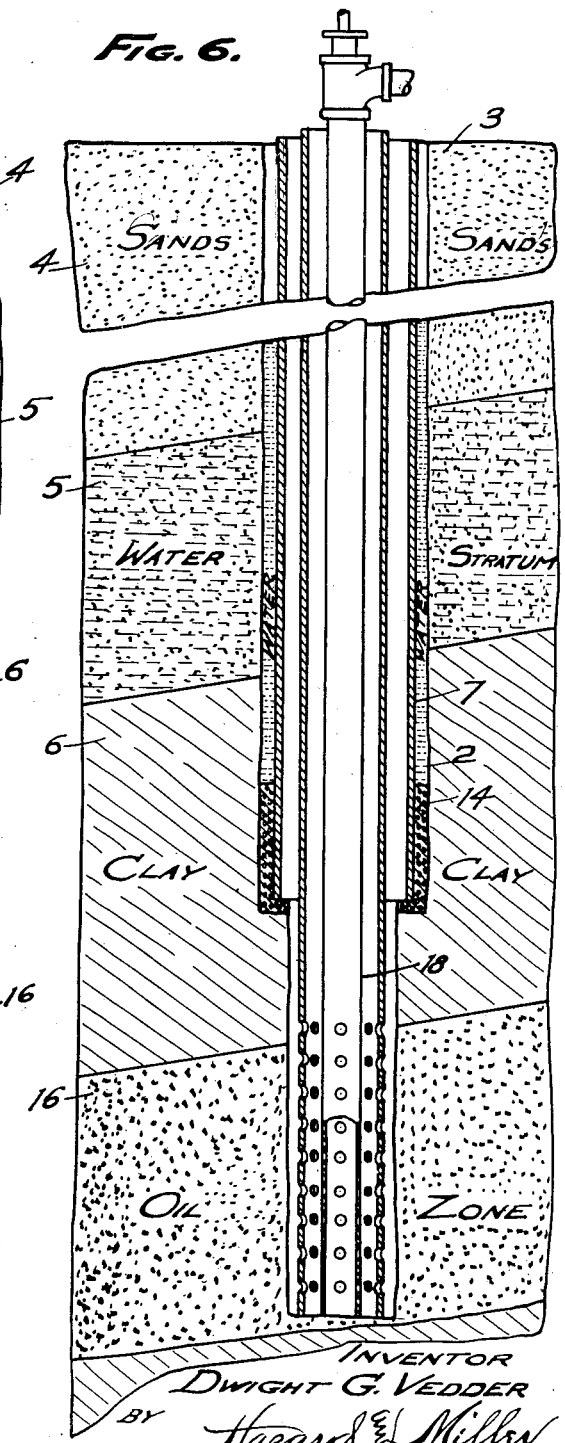

D. G. VEDDER.
METHOD OF SHUTTING A DELETERIOUS FLUID OUT OF VALUE PRODUCING WELLS.
APPLICATION FILED JULY 25, 1919.
1,342,781.
Patented June 8, 1920.
5 SHEETS—SHEET 5.
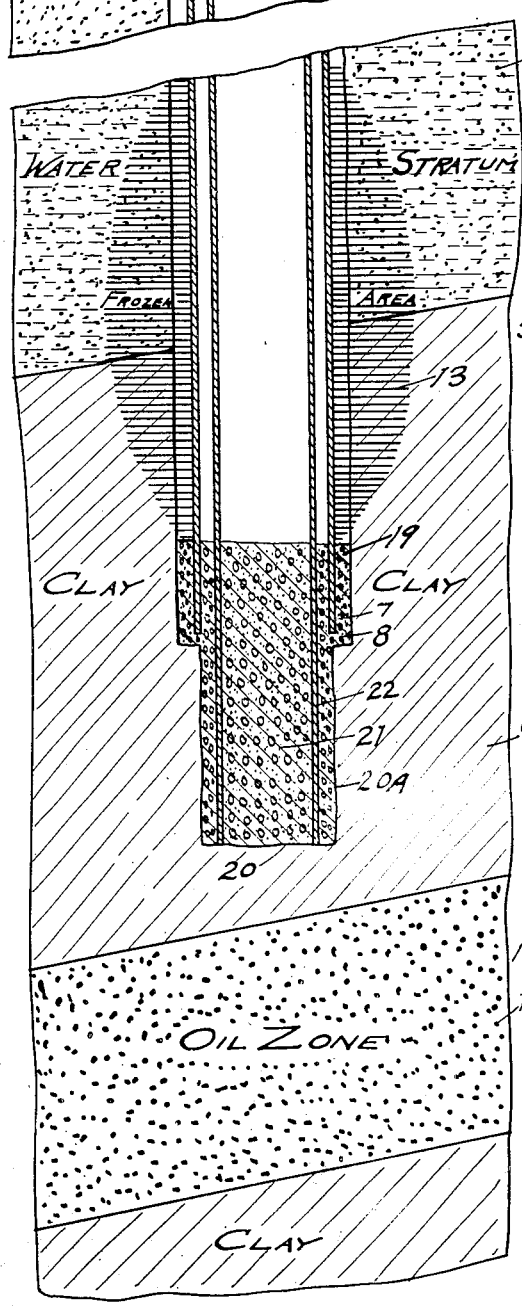
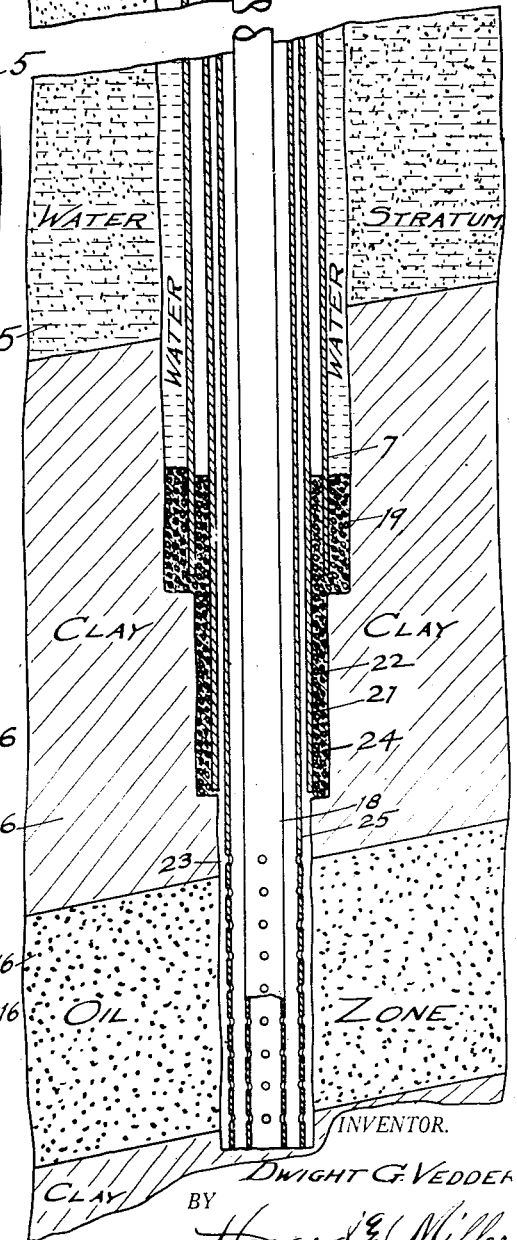
INVENTOR.
DWIGHT G. VEDDER
BY
ATTORNEYS.

UNITED STATES PATENT OFFICE.

DWIGHT G. VEDDER, OF BAKERSFIELD, CALIFORNIA.

METHOD OF SHUTTING A DELETERIOUS FLUID OUT OF VALUE-PRODUCING WELLS.

1,342,781. Specification of Letters Patent. Patented June 8, 1920.

Application filed July 25, 1919. Serial No. 313,319.

*To all whom it may concern:*

Be it known that I, DWIGHT G. VEDDER, a citizen of the United States, residing at Bakersfield, in the county of Kern and State of California, have invented new and useful Improvements in Methods of Shutting a Deleterious Fluid Out of Value-Producing Wells, of which the following is a specification.

My object is to make a method of shutting a deleterious fluid out of value producing wells, and my invention consists of the novel features herein shown, described and claimed.

My method is especially adaptable to a condition where the well has gone through a water formation into a clay formation and it is desired to shut the water out of the well and go through the clay formation to an oil or other stratum.

Water, by reason of its higher specific gravity, displaces oil and gas. Therefore, it is of first importance that the water seeping into the hole from the water bearing strata nearer the surface be prevented from flowing down the hole to the productive oil measures. Otherwise, when it has reached the latter it will displace the oil and gas, pushing them ahead of it, and eventually spreading for a considerable distance throughout the oil measures. The carelessness of one operator may lead to the ruin of an entire district.

The fundamental principle of all shut off methods is to form a water tight bond between the casing and the walls of the well hole at some impervious stratum above the productive oil sands and below the lowest water zone. Heretofore it has been very difficult and sometimes impossible to permanently shut off the water from above the oil stratum. The usual method of accomplishing a water shut off is to form a barrier outside of the casing by forcing cement around the lower end of the casing and up between the casing and the wall of the hole. It has been difficult to perform this cementing operation with water in the well and it has been impossible to remove the water. Frequently, after much expense, it has been necessary to abandon the well for the reason that it was impossible to place and harden the cement properly while the well was flooded with water. I overcome this difficulty by temporarily shutting off the water below the water stratum and exhausting the water from the well.

In the cementing of wells, as above described, it is usually impossible to obtain a satisfactory shut-off in anything but a solid formation, such as shale, clay, etc. With my method a complete shut-off of the water can be made in the loosest formation.

When a water stratum has been encountered in the well below the productive oil zone it is necessary to plug up the hole in order to shut off this damaging water. Cement is generally used to form this impervious barrier but the porosity of the sand and the flooded condition of the well makes it very difficult at times to remedy the condition. With my method the sands are made impervious and the well caused to be dry until the cement has been placed and allowed to cure thoroughly.

Figure 1 is a sectional view of an oil well which has gone through a water formation and has either not reached the oil zone or has been bridged or plugged back to a point above the oil zone and showing a plug in the bottom of the casing, so that the water may be extracted out of the casing above the plug or down to the required point above the plug, the insertion of the plug being the first step in my method.

Fig. 2 is a view analogous to Fig. 1 and shows the casing dry above the plug, the removal of part or all of the water above the plug being the second step in my method.

Figs. 3 and 3ᴬ together form an enlarged sectional view showing the apparatus and operation of temporarily freezing the water out of the well.

Fig. 4 is a sectional view showing the freezing apparatus removed and the plug removed and cement inserted below the frozen area so as to permanently exclude the water from the well after the freezing condition ceases to exist.

Fig. 5 is a sectional view showing the extension of the well through the cement barrier to the oil zone and the introduction of the smaller casing.

Fig. 6 is a view analogous to Fig. 5 and showing the introduction of the tubing making the well ready for operation and production of oil, and with the water permanently shut off.

Fig. 7 is a view of the well hole shown in Fig. 3ᴬ after the well has caved around the casing and the well extended downwardly and a second casing inserted.

Fig. 8 shows the second barrier applied to the well shown in Fig. 7 and the well extended downwardly a second time and a third casing inserted and the pump tube inserted ready for producing oil.

It is to be understood that all of the figures hereinafter given, that is, sizes, depths, and so on and the formations spoken of and shown upon the drawings are simply for example and that other conditions would require different figures and drawings.

Referring to Figs. 1 and 2, supposing that the bottom 1 of the well hole 2 is 2000 feet below the surface 3 of the ground and that the well hole has gone through earth and sand and the usual formations 4, and then through the stratum 5 of inexhaustible water and that the bottom 1 is in the impervious clay stratum 6. The well hole 2 has been made with a 15 inch drill and may have been made either with a rotary rig or with a standard rig. If the well hole 2 has been made with a rotary rig there is no casing in the well, and if the well hole has been made with a standard rig there is a ten inch casing 7 extending down, say 1998 feet, leaving a space 8 between the bottom of the casing and the bottom 1 of the well.

If there is no casing in the well the first thing to do is to put down the casing, and if the casing is in the well the next thing to do is to insert the water tight plug 9. The plug 9 should be located somewhat above the lower end of the casing 7 and should be below the lower part of the water stratum 5. The plug may be made and inserted in various ways.

After the plug 9 has been successfully made and placed in the well casing the casing will stand filled with water at least to a point opposite the top of the water stratum 5 and the next step in my method is to remove the water from the chamber 10 in the casing 7 above the plug 9, as shown in Fig. 2, or to remove part of the water from within the casing 7 down to the required position.

The freezing coil 11 is inserted into the chamber 10 down to the plug 9 and if all the water has been bailed from within the casing 7 above the plug 9 the chamber 10 is filled with a non-freezing solution such as calcium chlorid, for, say twenty feet above the plug. If the water has not all been removed above the plug 9 but simply extracted down to the required position, a suitable salt, such as calcium chlorid, will be placed inside of the casing and mixed with the water already there and thus form the required non-freezing solution. The refrigerating plant 12 is provided and connected to the coil 11 and brine or the like is passed through the refrigerating plant and circulated through the coil continuously for a considerable time and until the frozen area 13 is formed around the casing 7 above the plug 9 sufficiently to temporarily shut the water from flowing into the bottom of the well hole. After the water has been temporarily shut out of the well the freezing coil 11 is removed, the plug 9 is drilled out or otherwise removed or destroyed and the well hole is pumped or bailed dry.

A considerably quantity of cement or other suitable material is placed in the casing 7 and forced around the lower end of the casing in the space 8 and upwardly between the casing and the wall of the well hole to form the permanent barrier 14 between the impervious clay 6 and the casing 7 and below the water stratum 5.

The drilling outfit is brought into use and the extension 15 of the well hole is formed through the remainder of the clay stratum 6 and to the desired depth in the oil zone 16, and then the smaller casing 17 is inserted and the oil well is ready for the production of oil.

Referring to Fig. 7, suppose that the water has been temporarily shut off from the water stratum 5 by the frozen area 13 and by the method as shown and described with reference to Fig. 3 and 3ᴀ and the freezing apparatus removed and it is found that the formation has caved below the frozen area and filled up the space 8 around the bottom of the casing 7 with sloughing 19 thus making it impossible to place a cement barrier such as 14. In such a case the well hole is extended down, say 30 feet, to the point 20. If the old frozen barrier 13 has thawed the freezing operation is again brought into use in the same manner and place as before, thus temporarily shutting off the water from the stratum 5 to the bottom of the casing 7, then the freezing apparatus and plug are again removed and the well pumped or bailed practically dry.

Considerable cement or other suitable material 21 is then placed in the bottom of the dry hole 20ᵃ and a string of 8¼ inch casing 22 is lowered down inside of the 10" casing 7 to the bottom 20. After placing the casing 22 in the cement 21 to the bottom 20, the cement is bailed from the space inside of the casing 22 while still soft, or the cement is allowed to harden and the hard cement drilled out. This leaves a solid barrier 24 around the lower end of the casing 22 outside of the casing and between the casing 22 and the casing 7 and around the lower end of the casing 7, as shown in Fig. 8.

Referring to Fig. 8, drilling is again resorted to and the well hole extension 23 formed through the clay stratum 6 and down into the oil zone 16 to the required depth. The perforate 6¼ inch casing 25 is inserted to the bottom of the well, the pump tubing 18 placed in position and the well is ready for the production of oil from the oil zone 16.

It is to be understood that the cement or other suitable material for forming the barrier 24 may be placed in the dry well hole around the casing in other ways.

It is to be understood that my method may be applied to any value producing well as well as to an oil well, and that the water stratum may contain any fluid which is detrimental to the value of the well, and that the oil stratum may be any valuable fluid. For instance, the well may be made for the purpose of producing fresh water and the water stratum may be salt water or any fluid detrimental to the fresh water, or the value producing stratum may be salt, or sulfur, or any other valuable fluid.

Various changes may be made without departing from the spirit of my invention as claimed.

I claim:

1. The method of shutting water out of a fluid well comprising the insertion of a casing into the well, the insertion of a plug into the well casing between the water stratum and the value producing stratum, exhausting the water from the casing above the plug, inserting a non-freezing solution into the casing above the plug, inserting a freezing coil into the non-freezing solution, providing a refrigerating plant at the top of the well and connecting the plant to the freezing coil, circulating a freezing element through the refrigerating plant and through the freezing coil to temporarily freeze the area of the formation around the casing above the plug, removing the coil and freezing solution, removing the plug, exhausting the water from and around the casing below the frozen area, inserting cement to form a permanent barrier around the casing below the frozen area, and removing the cement from the casing.

2. The method of shutting water out of a fluid well having a casing comprising the insertion of a plug into the well casing between the water stratum and the value producing stratum, exhausting the water from the casing above the plug, inserting non-freezing solution into the casing above the plug, inserting a freezing coil into the non-freezing solution, providing a refrigerating plant at the top of the well and connecting the plant to the freezing coil, circulating a freezing element through the refrigerating plant and through the freezing coil to temporarily freeze the area of the formation around the casing above the plug, removing the coil and freezing solution, removing the plug, exhausting the water from and around the casing below the frozen area, inserting cement to form a permanent barrier around the casing below the frozen area, and removing the cement from the casing.

3. The method of shutting water out of a fluid well having a casing comprising the insertion of a plug into the well casing between the water stratum and the value producing stratum, exhausting the water from the casing above the plug, inserting non-freezing solution into the casing above the plug, inserting a freezing coil into the non-freezing solution, providing a refrigerating plant at the top of the well and connecting the plant to the freezing coil circulating a freezing element through the refrigerating plant and through the freezing coil to temporarily freeze the area of the formation around the casing above the plug, removing the coil and freezing solution, removing the plug, exhausting the water from around the casing between the frozen area and the value producing stratum, inserting cement to form a permanent barrier around the casing, and removing the cement from the casing.

4. The method of shutting a deleterious fluid out of a value producing well having a casing comprising the insertion of a plug into the casing between the deleterious stratum and the value producing stratum, exhausting the deleterious fluid from the casing above the plug, freezing the area of the formation around the casing above and adjacent to the plug, removing the plug, and inserting a plastic material through the casing and upwardly around the casing to form a barrier between the deleterious stratum and the value producing stratum.

5. The method of shutting a deleterious fluid out of a value producing well having a casing comprising forming a stoppage in the casing between the deleterious stratum and the value producing stratum, freezing the area of the formation around the casing adjacent the stoppage to temporarily shut off the flow of deleterious fluid, and forming a barrier between the frozen area and the value producing stratum and removing the stoppage.

In testimony whereof I have signed my name to this specification.

DWIGHT G. VEDDER.